(12) United States Patent
Sato et al.

(10) Patent No.: US 9,783,082 B2
(45) Date of Patent: Oct. 10, 2017

(54) VEHICLE SEAT SLIDE DEVICE

(71) Applicant: Aisin Seiki Kabushiki Kaisha, Kariya-shi (JP)

(72) Inventors: Takanori Sato, Kasugai (JP); Koji Kumagai, Chiryu (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/228,155

(22) Filed: Aug. 4, 2016

(65) Prior Publication Data

US 2017/0036566 A1    Feb. 9, 2017

(30) Foreign Application Priority Data

Aug. 6, 2015  (JP) ................................. 2015-156506

(51) Int. Cl.
| | | |
|---|---|---|
| *F16M 13/00* | (2006.01) | |
| *B60N 2/07* | (2006.01) | |
| *B60N 2/08* | (2006.01) | |

(52) U.S. Cl.
CPC ........... *B60N 2/0722* (2013.01); *B60N 2/073* (2013.01); *B60N 2/0705* (2013.01); *B60N 2/0715* (2013.01); *B60N 2/085* (2013.01); *B60N 2/0806* (2013.01); *B60N 2/0818* (2013.01); *B60N 2/0875* (2013.01); *B60N 2/0881* (2013.01)

(58) Field of Classification Search
USPC ....................................................... 248/429
See application file for complete search history.

(56) References Cited

U.S. PATENT DOCUMENTS

| | | | | |
|---|---|---|---|---|
| 6,116,561 | A * | 9/2000 | Christopher ........... | B60N 2/071 248/429 |
| 6,427,962 | B1 * | 8/2002 | Rohee .................. | B60N 2/0705 248/424 |
| 6,520,474 | B2 * | 2/2003 | Yoshida ................. | B60N 2/071 248/424 |
| 6,676,099 | B2 * | 1/2004 | Mallard ................. | B60N 2/015 248/429 |

(Continued)

FOREIGN PATENT DOCUMENTS

EP          2 886 389 A1     6/2015

*Primary Examiner* — Monica Millner
(74) *Attorney, Agent, or Firm* — Oblon, McClelland, Maier & Neustadt, L.L.P.

(57) ABSTRACT

A vehicle seat slide device includes: a lower rail including side wall portions provided to extend in a front-rear direction of a vehicle, a connecting wall portion connecting bottom ends of the side wall portions in a width direction, inward-extending wall portions overhanging from top ends of the side wall portions to inside in the width direction, and downward-extending wall portions overhanging downward from tips of the inward-extending wall portions; an upper rail including a main body portion and flanges; a locking member capable of restricting movement of the upper rail in the front-rear direction relative to the lower rail; and a reinforcement member bonded to a rear end of the lower rail and including a side wall reinforcement portion and an inward-extending wall reinforcement portion, and in which a cutout is formed in a rear end of the inward-extending wall reinforcement portion.

4 Claims, 8 Drawing Sheets

(56) References Cited

U.S. PATENT DOCUMENTS

| | | | | |
|---|---|---|---|---|
| 8,393,591 B2* | 3/2013 | Mizuno | ............... | B60N 2/0705 |
| | | | | 248/424 |
| 8,469,328 B2* | 6/2013 | Nakamura | ........... | B60N 2/0705 |
| | | | | 248/424 |
| 9,162,588 B2* | 10/2015 | Yamada | ............... | B60N 2/0722 |
| 2008/0048086 A1* | 2/2008 | Kojima | ............... | B60N 2/0705 |
| | | | | 248/429 |
| 2015/0069202 A1* | 3/2015 | Hayashi | .................. | B60N 2/08 |
| | | | | 248/429 |
| 2015/0191106 A1 | 7/2015 | Inoue et al. | | |

* cited by examiner

WIDTH DIRECTION

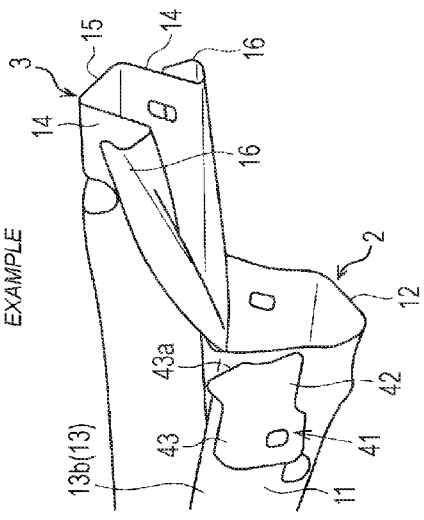
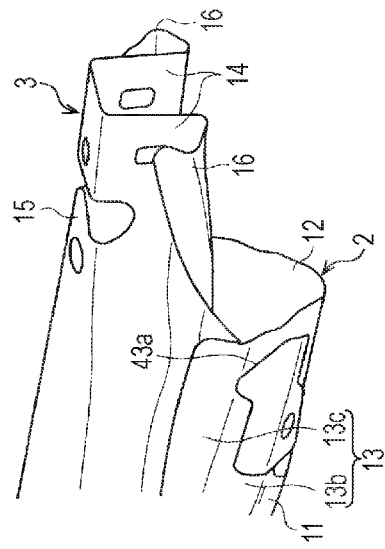
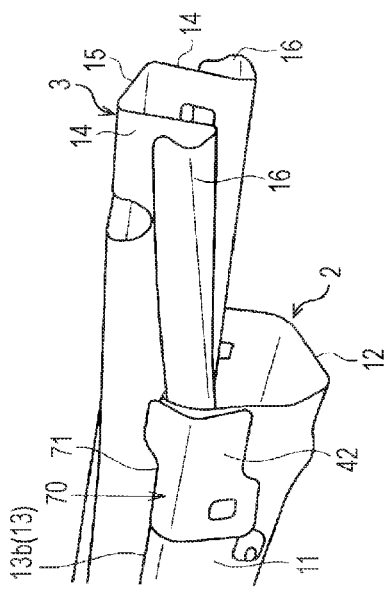
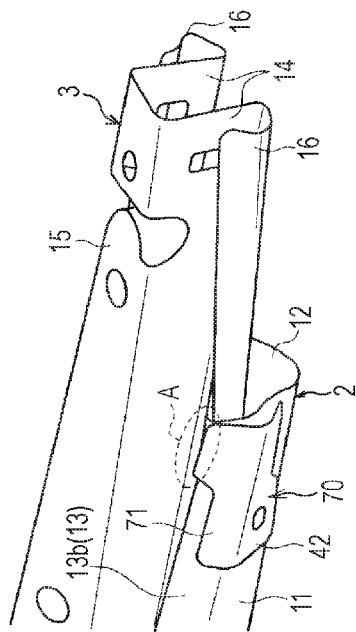
FIG. 6A COMPARATIVE EXAMPLE
FIG. 6B EXAMPLE

VEHICLE SEAT SLIDE DEVICE

CROSS REFERENCE TO RELATED APPLICATIONS

This application is based on and claims priority under 35 U.S.C. §119 to Japanese Patent Application 2015-156506, filed on Aug. 6, 2015, the entire contents of which are incorporated herein by reference.

TECHNICAL FIELD

This disclosure relates to a vehicle seat slide device.

BACKGROUND DISCUSSION

In the related art, there is known a vehicle seat slide device which is described in EPU: 2886389A1 (Reference 1), for example. The vehicle seat slide device is configured to include a lower rail which extends in a front-rear direction of the vehicle, an upper rail which is joined to the lower rail to be capable of moving relative thereto, and a locking member (a lock member) capable of restricting the movement of the upper rail.

In other words, as illustrated in FIG. 7, a lower rail 110 includes a pair of side wall portions 111 provided to line up in a width direction, a base wall portion 112 which connects the base ends (the bottom ends) of the side wall portions 111 in the width direction, a pair of inward-extending wall portions 113 which overhang from the tips (top ends) of the side wall portions 111 to the inside in the width direction in which the inward-extending wall portions 113 approach each other, and a pair of downward-extending wall portions 114 which overhang downward from the tips of the inward-extending wall portions 113.

An upper rail 120 includes a main body portion 121 which stands vertically between the downward-extending wall portions 114, and a pair of flanges 122 which overhang from the tip (the bottom end) of the main body portion 121 to the outsides in the width direction and are further folded so as to be surrounded by the side wall portions 111, the inward-extending wall portions 113, and the downward-extending wall portions 114.

Both the lower rail 110 and the upper rail 120 have symmetrical (laterally symmetrical) rail cross sections in the width direction thereof, and are mainly prevented from dislocating in an up-down direction by the engagement of the inward-extending wall portions 113, the downward-extending wall portions 114, and the flanges 122. It goes without saying that the engagement state of the lower rail 110 and the upper rail 120 is substantially fixed along the entire length in a longitudinal direction thereof.

As illustrated in FIGS. 8A and 8B, a reinforcement member 130 is bonded to the rear end of the lower rail 110. The reinforcement member 130 is formed of reinforcement plates 131, which are formed of a pair of plate materials provided to line up in the width direction, and each of the reinforcement plates 131 includes an inward-extending wall reinforcement portion 133 and a side wall reinforcement portion 132, and is substantially L-shaped. The side wall reinforcement portions 132 cover the side wall portions 111, and the inward-extending wall reinforcement portions 133 cover the inward-extending wall portions 113.

Here, for example, when the lower rail 110 receives input of a significant load upward from the seat side (for example, a seatbelt) which is supported by the upper rail 120 due to a frontal collision of the vehicle, the lower rail 110, the inward-extending wall portions 113 or the like of which are pressed by the flanges 122 of the upper rail 120 which is pulled upward, deforms (so-called separating deformation) such that the opening end side thereof opens. Favorable energy absorption with the deformation is realized due to the deformation of the lower rail 110 at this time transitioning in a similar manner to that presumed during design.

In particular, due to the reinforcement member 130 being bonded to the rear end of the lower rail 110, it is considered possible to delay the separating deformation of the lower rail 110 when a large load is input. This is because, ordinarily, during a frontal collision of the vehicle, since the deformation of the lower rail 110 generally proceeds from the rear toward the front, the rear-to-front deformation is suppressed at the starting time of the deformation.

Due to the reinforcement member 130 evenly covering the side wall portions 111 and the inward-extending wall portions 113 using the side wall reinforcement portions 132 and the inward-extending wall reinforcement portions 133, the separating deformation of the lower rail 110 when a large load is input may be impeded, and the lower rail 110 may break. The deformation mode of the lower rail 110 caused by the breaking lacks regularity in the affected parts, the occurrence timing, and the like, and is unstable in comparison to the separating deformation mode.

SUMMARY

Thus, a need exists for a vehicle seat slide device which is not susceptable to the drawback mentioned above.

A vehicle seat slide device according to an aspect of this disclosure includes a lower rail which includes a pair of side wall portions provided to extend in a front-rear direction of a vehicle and provided to line up in a width direction, a connecting wall portion which connects bottom ends of the side wall portions to each other in the width direction, a pair of inward-extending wall portions which overhang from top ends of the side wall portions to inside in the width direction in which the inward-extending wall portions approach each other, and a pair of downward-extending wall portions which overhang downward from tips of the inward-extending wall portions, an upper rail which is joined to the lower rail to be capable of moving in the front-rear direction of the vehicle and includes a main body portion which is disposed between the downward-extending wall portions, and a pair of flanges which overhang from a tip of the main body portion to outside in the width direction in which the flanges separate from each other and are further folded to be surrounded by the side wall portions, the inward-extending wall portions, and the downward-extending wall portions, a locking member capable of restricting movement of the upper rail in the front-rear direction of the vehicle relative to the lower rail; and a reinforcement member which is bonded to a rear end of the lower rail, includes a side wall reinforcement portion covering the side wall portion and an inward-extending wall reinforcement portion which overhangs from a top end of the side wall reinforcement portion to an inside in the width direction to cover the inward-extending wall portion, and in which a cutout is formed in a rear end of the inward-extending wall reinforcement portion such that peripheral parts of a corner portion formed by a rear end of the inward-extending wall portion and the tip of the inward-extending wall portion are exposed.

BRIEF DESCRIPTION OF THE DRAWINGS

The foregoing and additional features and characteristics of this disclosure will become more apparent from the following detailed description considered with the reference to the accompanying drawings, wherein:

FIGS. 6A and 6B are schematic diagrams illustrating examples of the deformation state when a large load is input to a vehicle seat slide device of a comparative example and an example;

DETAILED DESCRIPTION

Hereinafter, description will be given of an embodiment of a vehicle seat slide device. Hereinafter, the front-rear direction of the vehicle will be referred to as the "front-rear direction".

Figure 1:
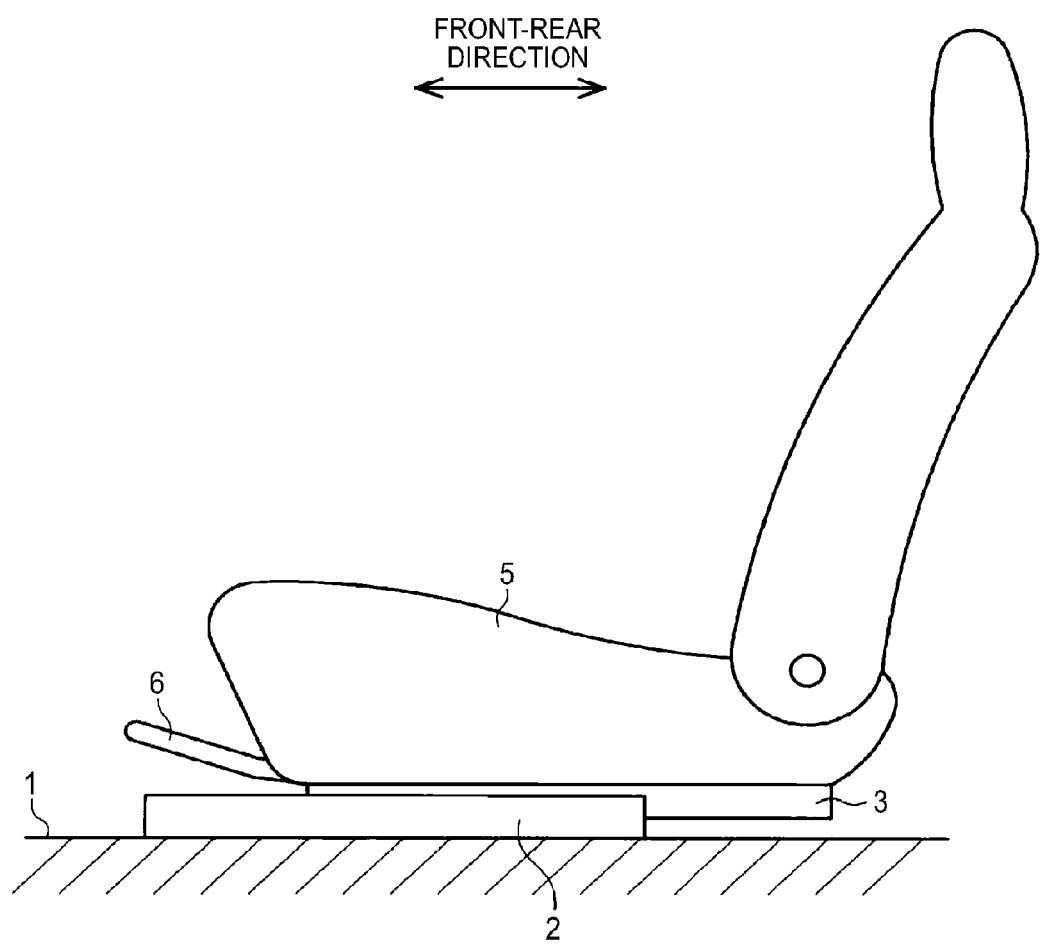
FIG. 1 is a side surface view illustrating a vehicle seat to which an embodiment of a vehicle seat slide device is applied.

As illustrated in FIG. 1, a lower rail 2 is fixed to a vehicle floor 1 in a state of extending in the front-rear direction, and an upper rail 3 is joined to the lower rail 2 to be capable of moving in the front-rear direction relative to the lower rail 2. In other words, in the embodiment, the longitudinal direction (a relative movement direction) of the lower rail 2 and the upper rail 3 matches the front-rear direction.

The lower rail 2 and the upper rail 3 are both arranged in pairs in the width direction (a direction orthogonally intersecting the paper surface in FIG. 1), and here, those which are disposed on the left side as viewed when facing forward are illustrated. A seat 5 which forms a passenger seating portion is fixed to and supported by the upper rails 3. The relative movement between the lower rail 2 and the upper rail 3 is generally in a restricted state, and a release handle 6 is provided for releasing the restricted state.

Figure 2:
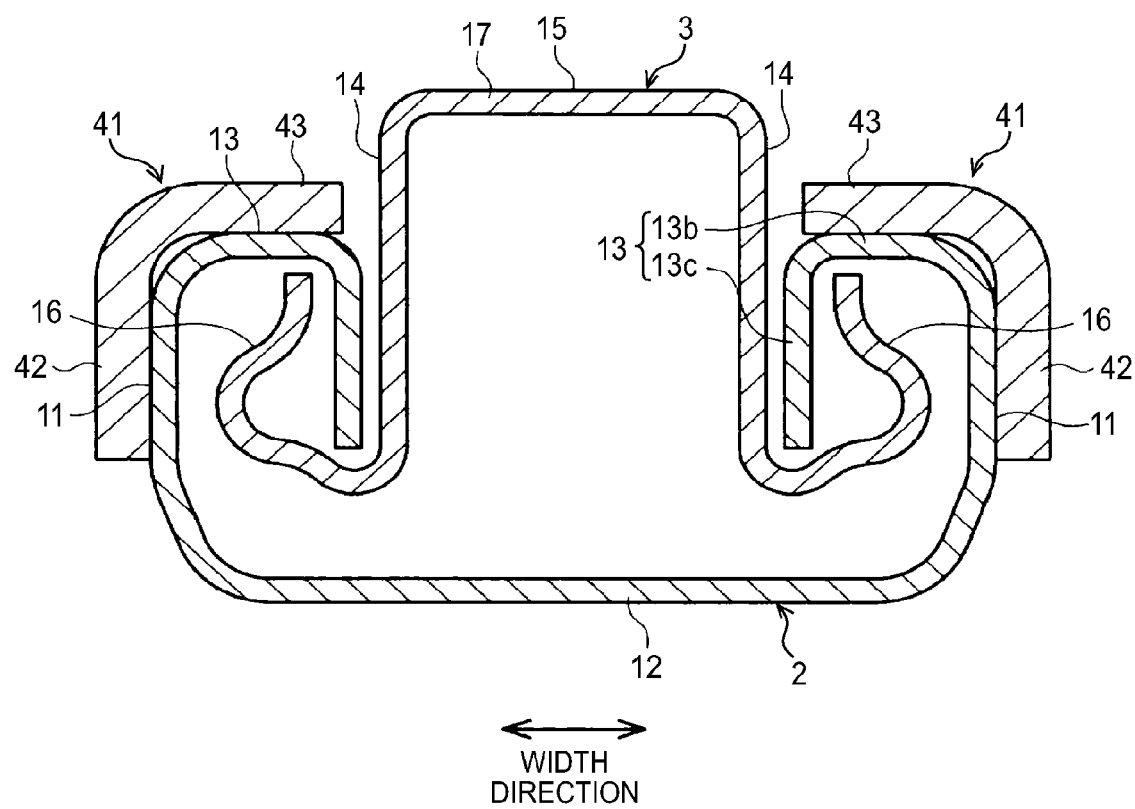
FIG. 2 is a sectional diagram taken along a 2-2 line of FIG. 4B.

As illustrated in FIG. 2, the lower rail 2 is formed of a plate material, and includes first side wall portions 11, and a base wall portion 12. The first side wall portions 11 are a pair of side wall portions which extend in the up-down direction on both sides in the width direction, and the base wall portion 12 is a connecting wall portion which connects the base ends (the bottom ends) of the first side wall portions 11 to each other in the width direction. The lower rail 2 includes a pair of inward-extending wall portions 13b, and a pair of downward-extending wall portions 13c. The pair of inward-extending wall portions 13b overhang from the tips (top ends) of the first side wall portions 11 to the inside in the width direction in which the inward-extending wall portions 13b approach each other, and the pair of downward-extending wall portions 13c overhang downward from the tips of the inward-extending wall portions 13b. The inward-extending wall portions 13b and the downward-extending wall portions 13c which are continuous form first flanges 13.

A plurality of square lock holes 13a are formed on base end portions (top end portions) of the first flanges 13 of the lower rail 2 leaving a predetermined interval in the longitudinal direction. Each of the lock holes 13a is formed across an area including a connecting portion of the inward-extending wall portion 13b and the downward-extending wall portion 13c, is open upward, and is blocked downward.

As illustrated in FIG. 2, the upper rail 3 is formed of a plate material, and includes a pair of second side wall portions 14 and a cap wall portion 15. The pair of second side wall portions 14 extend in the up-down direction between the first flanges 13 (the downward-extending wall portions 13c) of the lower rail 2, and the cap wall portion 15 connects the base ends (the top ends), which distance from the lower rail 2, of the second side wall portions 14 to each other in the width direction. A second flange 16 is continuously formed on the tip (the bottom end) of the base wall portion 12 side of each of the second side wall portions 14. The second flange 16 is a flange which overhangs to the outside in the width direction, and further, is folded over so as to be surrounded by the first side wall portion 11 and the first flange 13 (the inward-extending wall portion 13b and the downward-extending wall portion 13c). The second side wall portions 14 and the cap wall portion 15 form a main body portion 17 which has a substantially U-shaped cross section and is open downward. Naturally, the main body portion 17 is disposed between the downward-extending wall portions 13c.

In other words, the lower rail 2 and the upper rail 3 have U-shaped rail cross sections, the opening sides of which abut against each other, and are mainly prevented from dislocating in the up-down direction by the engagement of the first flanges 13 and the second flanges 16.

Figure 3:
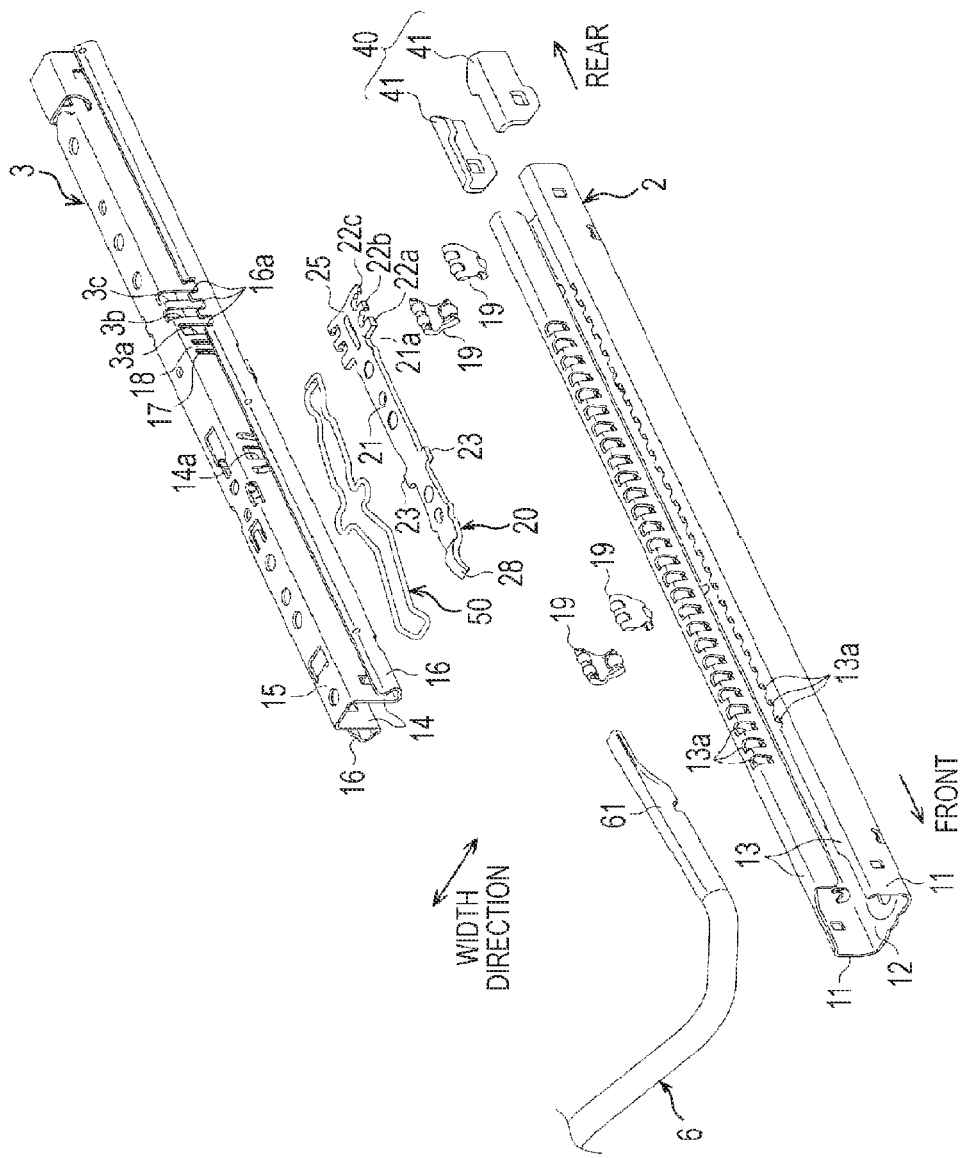
FIG. 3 is an exploded perspective diagram illustrating the structure of the vehicle seat slide device of the embodiment.
Figure 4A:
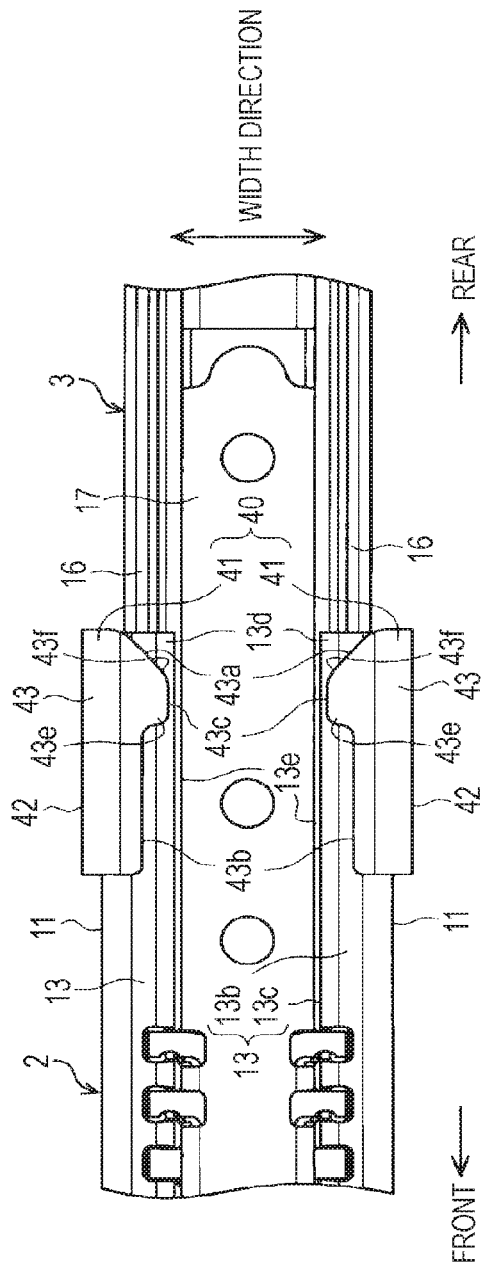
FIG. 4A is a plan view illustrating the structure of the vehicle seat slide device of the embodiment.
Figure 4B:
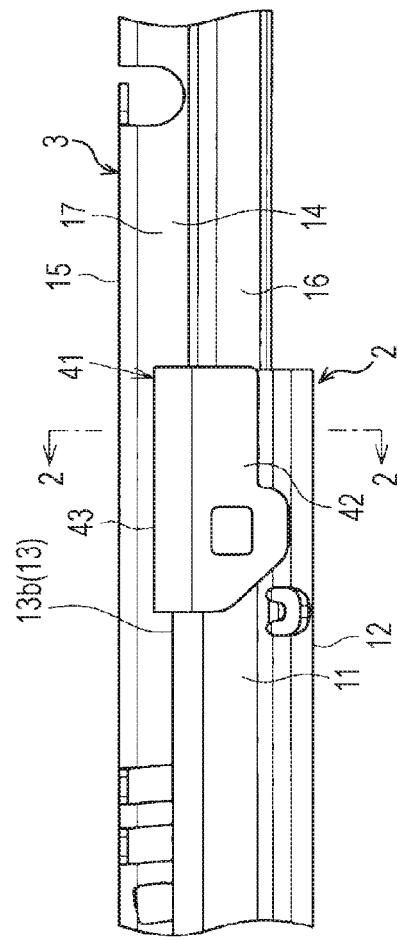
FIG. 4B is a side surface view illustrating the structure of the vehicle seat slide device of the embodiment.
Figure 5:
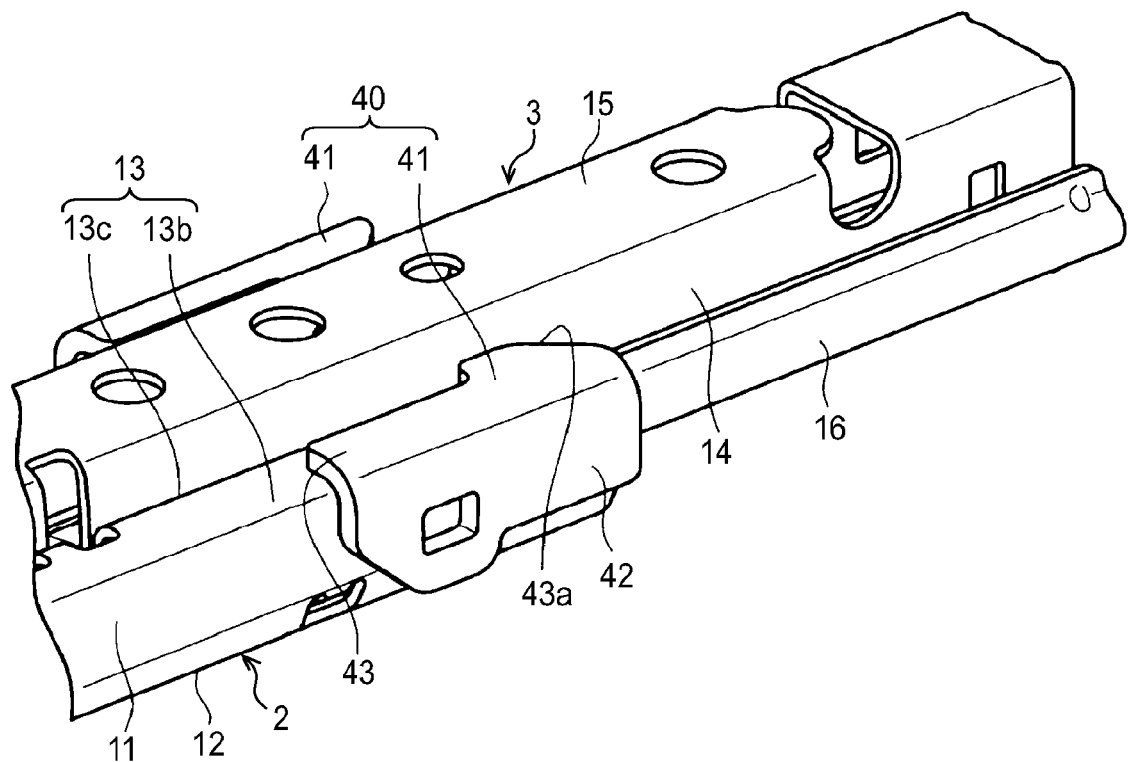
FIG. 5 is a perspective diagram illustrating the structure of the vehicle seat slide device of the embodiment.
Figure 7:
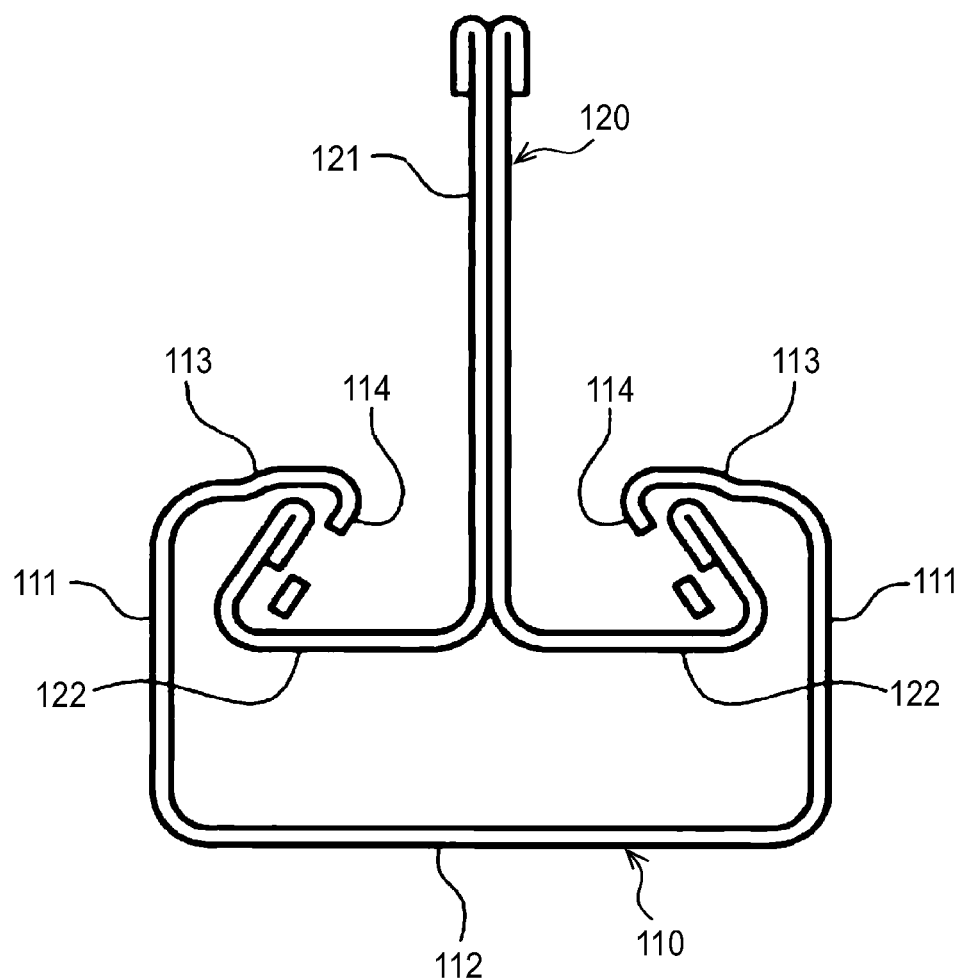
FIG. 7 is a sectional diagram illustrating the structure of a vehicle seat slide device of the related art.
Figure 8A:
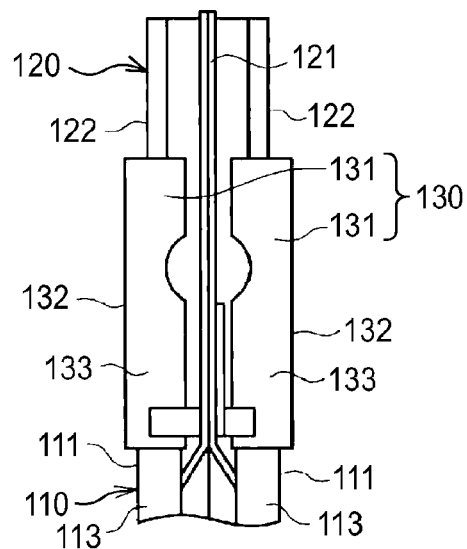
FIG. 8A is a plan view illustrating the structure of the vehicle seat slide device of the related art.
Figure 8B:
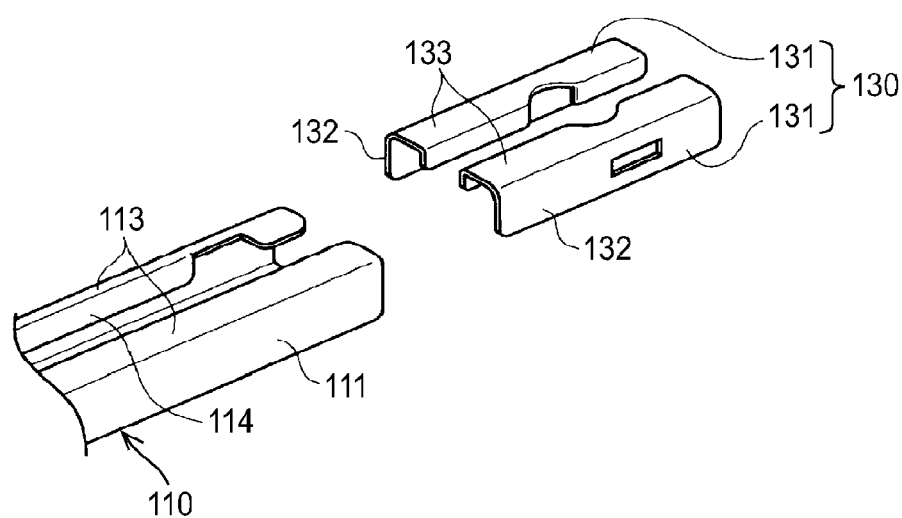
FIG. 8B is an exploded perspective diagram illustrating the structure of the vehicle seat slide device of the related art.

As illustrated in FIG. 3, a plurality of (three) lock claw holes 3a, 3b, and 3c which are provided to line up in the longitudinal direction are formed in a longitudinal direction middle portion of each side in the width direction of the upper rail 3. The interval between the lock claw holes 3a to 3c is approximately the same as the interval between the lock holes 13a. The lock claw holes 3a to 3c are formed to extend in the up-down direction along an area reaching a portion of the cap wall portion 15 from the second side wall portions 14, and are open in the width direction.

A plurality of (three) fitting grooves 16a which are provided to line up in the longitudinal direction are formed on the tip (the top end) of each of the second flanges 16 in positions corresponding to the lock claw holes 3a to 3c. The fitting grooves 16a are open upward. The fitting grooves 16a and the lock claw holes 3a to 3c are disposed in positions capable of matching the plurality of (three) lock holes 13a which are adjacent on the lower rail 2.

A shaft accommodating hole 14a is formed in each of the second side wall portions 14 closer to the front of the vehicle than the lock claw holes 3a to 3c. The shaft accommodating hole 14a is formed in a substantially isosceles trapezoidal shape which expands toward the top, and is open in the width direction.

As illustrated in FIG. 3, a pair of rotating members 19 is interposed, at both the front and the rear, between the second flanges 16 and the first side wall portions 11 facing the second flanges 16. The upper rail 3 is supported to be capable of sliding freely in the front-rear direction in relation to the lower rail 2 in a state causing the rotating members 19 to rotate between the upper rail 3 and the lower rail 2.

As illustrated in FIGS. 4A and 4B to 5, a reinforcement member 40 is bonded to the rear end of the lower rail 2 by welding, for example. The reinforcement member 40 is formed of reinforcement plates 41 formed of a pair of plate materials provided to line up in the width direction, and each of the reinforcement plates 41 includes a side wall reinforcement portion 42 which covers the corresponding first side wall portion 11 from the outside in the width direction, and an inward-extending wall reinforcement portion 43 which covers the corresponding inward-extending wall portion 13b from above. Each of the reinforcement plates 41 is substantially L-shaped. The side wall reinforcement portion 42 extends from the connecting portion (corner portion) between the side wall reinforcement portion 42 and the inward-extending wall reinforcement portion 43 to the middle portion in the up-down direction of the first side wall portion 11, and the inward-extending wall reinforcement portion 43 extends from the connecting portion (the corner portion) between the inward-extending wall reinforcement portion 43 and the side wall reinforcement portion 42 to the vicinity of the tip of the inward-extending wall portion 13b to form an end portion 43c of the inside in the width direction in the inward-extending wall reinforcement portion 43. A substantially triangular cutout 43a is formed on the rear end of the inward-extending wall reinforcement portion 43 aligned to a corner portion 13d formed by the rear end of the inward-extending wall portion 13b and a tip 13e of the inward-extending wall portion 13b. In other words, the inward-extending wall reinforcement portion 43 is shaped such that the distance between the end portion 43c of the inside in the width direction in the inward-extending wall reinforcement portion 43 and the top end of the side wall reinforcement portion 42 decreases from a front-rear direction middle portion 43e toward the rear end due to the cutout 43a. In other words, the inward-extending wall reinforcement portion 43 does not uniformly cover (retain) up to the rear end of the inward-extending wall portion 13b, and the rear end of the inward-extending wall reinforcement portion 43 is shaped such that the peripheral parts of the corner portion 13d are exposed. The cutout 43a is not limited to a substantially triangular shape, and as long as the shape is such that the peripheral parts of the corner portion 13d are exposed, another shape may be adopted such as one in which a sloped edge 43f of the cutout 43a is a curved shape, for example. A substantially rectangular removed portion 43b is formed in the inward-extending wall reinforcement portion 43 by removing the end portion 43c of the inside in the width direction from the front-rear direction middle portion 43e along the front end.

The lower rail 2 and the reinforcement member 40 are bonded together via weld bonding portions which are disposed in a plurality of locations (for example, the center portion of the side wall reinforcement portion 42, the part extending in the front-rear direction of the removed portion 43b, and the like) of the abutting surfaces of the lower rail 2 and the reinforcement member 40. The weld bonding portions are set to not be disposed in the cutout 43a.

As illustrated in FIG. 3, a locking member 20 formed of a plate material is disposed inside the upper rail 3 to be parallel to the longitudinal direction of the upper rail 3. The locking member 20 is generally disposed on the inside in the width direction of the second side wall portions 14, and is joined to the upper rail 3 to rotate freely.

In other words, the locking member 20 includes a main body portion 21, a pair of a set of lock claws 22a, 22b, and 22c, a pair of substantially rectangular rotating shaft portions 23, and an input portion 28.

The main body portion 21 is formed in a substantially rectangular plate shape extending in the front-rear direction, and the dimension of the width direction of the main body portion 21 is set to be smaller than the distance in the width direction between the second side wall portions 14 of the upper rail 3. The rotating shaft portions 23 are provided to protrude to the outside in the width direction in the front-rear direction middle portion of the main body portion 21. The locking member 20 is joined to the upper rail 3 to be capable of rotating freely in the up-down direction around an axial line (the rotating shaft portions 23) extending in the width direction due to the rotating shaft portions 23 being inserted into the shaft accommodating holes 14a of the upper rail 3.

The lock claws 22a to 22c are disposed on a rear end portion 21a of the main body portion 21. In other words, the lock claws 22a to 22c are provided to protrude to the outside in the width direction of the rear end portion 21a. The lock claws 22a to 22c of each side are disposed at the same interval as the lock holes 13a of the lower rail 2 along the longitudinal direction. Together with the rear end portion 21a, the pairs of lock claws 22a to 22c form a locking portion 25.

The lock claws 22a to 22c pass through the lock claw holes 3a to 3c, and are fitted into the three fitting grooves 16a. When the locking member 20 rotates around the rotating shaft portions 23 such that the locking portion 25 descends, the lock claws 22a to 22c are capable of fitting into three of the lock holes 13a which are adjacent to each other. When the lock claws 22a to 22c are fitted into the lock holes 13a, the relative movement between the lower rail 2 and the upper rail 3 is restricted. Meanwhile, when the locking member 20 rotates around the rotating shaft portions 23 such that the locking portion 25 rises, the lock claws 22a to 22c are capable of detaching from the lock holes 13a. When the lock claws 22a to 22c detach from the lock holes 13a, the restriction of the relative movement between the lower rail 2 and the upper rail 3 is released.

The input portion 28 is formed on the end portion (the front end portion) of the opposite side from the rear end portion 21a in the main body portion 21.

A lock spring 50 formed of a single wire material is disposed inside the upper rail 3. The lock spring 50 is formed to be substantially ring shaped, extending in the front-rear direction, and is held by the upper rail 3 at the middle portion in the longitudinal direction of the lock spring 50. The lock spring 50 abuts against the top surface of the locking member 20 at the rear end portion, and thus, biases the locking member 20 in the rotation direction of the side to which the locking portion 25 descends, that is, the side at which the lock claws 22a to 22c fit into the lock holes 13a.

A tip portion 61 of each side in the width direction of the release handle 6 extends to the rear of the vehicle and is inserted into the upper rail 3. At this time, the rear end of the tip portion 61 is positioned above the input portion 28. When the release handle 6 is operated so as to be lifted up, the tip portion 61 pushes the input portion 28 of the locking member 20 in the rotation direction of the side at which the locking portion 25 rises against the biasing force of the lock spring 50, that is, the side at which the lock claws 22a to 22c separate from the lock holes 13a.

Here, the operational force of the release handle 6 is released. At this time, due to the biasing force of the lock spring 50, the locking member 20 rotates in the rotation direction of the side at which the locking portion 25 descends around the rotating shaft portions 23, that is, the side at which the lock claws 22a to 22c are fitted into the lock holes 13a, and thus, the relative movement between the lower rail 2 and the upper rail 3 is restricted as described above. The position in the front-rear direction of the seat 5 which is supported by the upper rails 3 is held.

Subsequently, when the release handle 6 is operated so as to be lifted up, the tip portion 61 thereof pushes the input portion 28 of the locking member 20 downward. At this time, against the biasing force of the lock spring 50, the locking member 20 rotates to the side at which the locking portion 25 rises around the rotating shaft portions 23, that is, the side at which the lock claws 22a to 22c detach from the lock holes 13a, and thus, the restriction of the relative movement between the lower rail 2 and the upper rail 3 is released as described above. It becomes possible to adjust the position in the front-rear direction of the seat 5 which is supported by the upper rails 3.

Next, description will be given of the operations of the embodiment.

For example, when the lower rail 2 receives input of a significant load upward from the seat 5 side (for example, a seatbelt) which is supported by the upper rail 3 due to a frontal collision of the vehicle, the lower rail 2, the inward-extending wall portions 13b or the like of which are pressed by the second flanges 16 of the upper rail 3 which is pulled upward, deforms (so-called separating deformation) such that the opening end side thereof opens. Accordingly, favorable energy absorption is realized.

In particular, due to the reinforcement member 40 being bonded to the rear end of the lower rail 2, it is possible to delay the separating deformation of the lower rail 2 when a large load is input. This is because, ordinarily, during a frontal collision of the vehicle, since the deformation of the lower rail 2 generally proceeds from the rear toward the front, the rear-to-front deformation is suppressed at the starting time of the deformation. Therefore, the effect of delaying the separating deformation of the lower rail 2 is significant when the upper rail 3 is in a state of protruding further to the rear of the vehicle than the rear end of the lower rail 2 (for example, a state in which the upper rail 3 is positioned at the rearmost of the movable area of the upper rail 3).

Meanwhile, due to the cutout 43a being formed in the rear end of each of the inward-extending wall reinforcement portions 43 of the reinforcement member 40 (the reinforcement plates 41), it is possible to suppress the impedance of the separating deformation of the lower rail 2 using the reinforcement member 40 when a large load is input. This is because the deformation space of the lower rail 2 is secured by the cutouts 43a.

FIG. 6A illustrates an example of a deformation state when a large load is input in a comparative example in which a reinforcement member 70, which has the same shape as the reinforcement member 40 except for the cutouts 43a of the inward-extending wall reinforcement portions 43 being omitted, is bonded to the lower rail 2. Accordingly, instead of the inward-extending wall reinforcement portion 43, the reinforcement member 70 includes an inward-extending wall reinforcement portion 71 which evenly covers up to the rear end of the inward-extending wall portion 13b. Meanwhile, FIG. 6B illustrates an example of the deformation state when a large load is input in an example in which the reinforcement member 40 is bonded to the lower rail 2. As illustrated in FIG. 6B, relative to the example, in the comparative example, the stopping of the deformation (the separating deformation of the lower rail 2) of the inward-extending wall portion 13b, particularly in an area A surrounded by a dotted line, is significantly confirmed. Since the occurrence of stress concentration is anticipated at such deformation stopping locations, the chance of the lower rail 2 breaking at these locations increases.

According to the embodiment, as described in detail above, it is possible to obtain the following effects.

(1) In the embodiment, it is possible to suppress the impedance of the separating deformation while delaying the separating deformation of the lower rail 2 when a large load is input. It is possible to suppress the deformation destabilizing of the lower rail 2, such as breaking of the lower rail 2, and thus, it is possible to realize favorable energy absorption with the deformation.

(2) In the embodiment, the cutout 43a is formed on the inward-extending wall reinforcement portions 43 on both sides. Therefore, it is possible to cause the separating deformation of the lower rail 2 to proceed uniformly at both sides in the width direction when a large load is input.

(3) In the embodiment, the weld bonding portions are set to not be disposed in the cutout 43a. Therefore, it is possible to reduce the bonding strength of the lower rail 2 and the reinforcement member 40 in the cutout 43a. Accordingly, it is possible to further suppress the impedance of the separating deformation of the lower rail 2 using the reinforcement member 40 when a large load is input.

The embodiment described above may be modified as described below.

In the embodiment, the removed portion 43b of the inward-extending wall reinforcement portions 43 may be omitted. In other words, the inward-extending wall reinforcement portion 43 may evenly cover the inward-extending wall portion 13b from the front-rear direction middle portion to the front end.

In the embodiment, the cutout 43a of the inward-extending wall reinforcement portion 43 of one side may be omitted.

In the embodiment, the reinforcement plate 41 (the side wall reinforcement portion 42 and the inward-extending wall reinforcement portion 43) of one side may be omitted.

In the embodiment, as long as the cutout 43a is capable of securing space for the deformation of the lower rail 2, the shape of the cutout 43a is arbitrary. For example, a substantially rectangular shaped cutout or a substantially fan-shaped cutout which is formed to conform with a corner portion formed by the end portion and the inside end in the width direction of the inward-extending wall portion 13b may be adopted.

The cutout 43a may span an area reaching a portion of the side wall reinforcement portion 42 from the inward-extending wall reinforcement portion 43.

In the embodiment, the reinforcement member 40 may be formed of a single plate material which integrally includes the side wall reinforcement portions 42 and the inward-extending wall reinforcement portions 43 (the reinforcement plates 41). Specifically, the bottom ends of the side wall reinforcement portions 42 may be connected to each other in the width direction to integrate the reinforcement plates 41 so as to cover the base wall portion 12 and the like of the lower rail 2 from below.

In the embodiment, the main body portion 17 of the upper rail 3 may be a vertical wall shape extending in the up-down direction. In other words, the upper rail 3 may have a substantially inverted T-shaped rail cross section.

In the embodiment, the structure of the locking member 20 is an example. For example, a locking member may be adopted in which the relationship between the falling and rising of the locking portion 25 and the movement restriction and releasing of the upper rail 3 is set to the opposite of each other. The rotation of the locking member relating to the movement restriction and releasing of the upper rail 3 may be around an axial line extending in a direction other than the width direction (for example, the front-rear direction). The locking member may be supported by the lower rail 2. In this case, the release operation of the locking member which is supported by the lower rail 2 may be performed from an appropriate operation member through a cable or the like, for example.

In the embodiment, the lower rail 2 and the upper rail 3 (the vehicle seat slide device) may be configured such that one of each is arranged for the seat 5, and may be configured such that three or more of each is arranged for the seat 5.

In the embodiment, the seat 5 which is supported by the upper rail 3 may face the rear of the vehicle. In other words, the front-rear direction of the upper rail 3 and the like may not necessarily match the front-rear direction of the seat 5 as long as the front-rear direction of the upper rail 3 matches the front-rear direction of the vehicle.

In the embodiment, in the inward-extending wall reinforcement portion which evenly covers up to the rear end of the inward-extending wall portion 13b, it is feasible to form the part corresponding to the substantially triangular cutout portion of the cutout 43a thinner than the other parts. Even in this case, it is possible to suppress impedance of the separating deformation using the reinforcement member.

A vehicle seat slide device according to an aspect of this disclosure includes a lower rail which includes a pair of side wall portions provided to extend in a front-rear direction of a vehicle and provided to line up in a width direction, a connecting wall portion which connects bottom ends of the side wall portions to each other in the width direction, a pair of inward-extending wall portions which overhang from top ends of the side wall portions to inside in the width direction in which the inward-extending wall portions approach each other, and a pair of downward-extending wall portions which overhang downward from tips of the inward-extending wall portions, an upper rail which is joined to the lower rail to be capable of moving in the front-rear direction of the vehicle and includes a main body portion which is disposed between the downward-extending wall portions, and a pair of flanges which overhang from a tip of the main body portion to outside in the width direction in which the flanges separate from each other and are further folded to be surrounded by the side wall portions, the inward-extending wall portions, and the downward-extending wall portions, a locking member capable of restricting movement of the upper rail in the front-rear direction of the vehicle relative to the lower rail; and a reinforcement member which is bonded to a rear end of the lower rail, includes a side wall reinforcement portion covering the side wall portion and an inward-extending wall reinforcement portion which overhangs from a top end of the side wall reinforcement portion to an inside in the width direction to cover the inward-extending wall portion, and in which a cutout is formed in a rear end of the inward-extending wall reinforcement portion such that peripheral parts of a corner portion formed by a rear end of the inward-extending wall portion and the tip of the inward-extending wall portion are exposed.

According to this configuration, due to the reinforcement member being bonded to the rear end of the lower rail, it is possible to delay the separating deformation when a large load is input. Meanwhile, due to the cutout being formed in the rear end of the inward-extending wall reinforcement portion of the reinforcement member so as to expose peripheral parts of a corner portion formed by a rear end of the inward-extending wall portion and the tip of the inward-extending wall portion, it is possible to suppress the impedance of the separating deformation of the lower rail using the reinforcement member when a large load is input. It is possible to suppress the occurrence of the lower rail breaking or the like, and the destabilization of the deformation caused thereby.

In the vehicle seat slide device, it is preferable that an end portion of the inside in the width direction in the inward-extending wall reinforcement portion is shaped to approach a top end of the side wall reinforcement portion from a front-rear direction middle portion in the middle of the front-rear direction of the reinforcement member toward the rear end.

In the vehicle seat slide device, it is preferable that the reinforcement member includes a pair of the side wall reinforcement portions and a pair of the inward-extending wall reinforcement portions, and the cutout is formed in each of the inward-extending wall reinforcement portions.

According to this configuration, it is possible to cause the separating deformation of the lower rail to proceed uniformly at both sides in the width direction when a large load is input.

In the vehicle seat slide device, it is preferable that the lower rail and the reinforcement member are bonded via a weld bonding portion, and the weld bonding portion is set to not be disposed at the cutout.

According to this configuration, by setting the weld bonding portion to not be disposed at the cutout, it is possible to reduce the join strength of the lower rail and the reinforcement member at the cutout. Accordingly, it is possible to further suppress the impedance of the separating deformation of the lower rail using the reinforcement member when a large load is input.

The aspect of this disclosure has an advantage that the destabilization of the deformation of the lower rail is suppressed while the separating deformation of the lower rail is delayed when a large load is input.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat slide device of a vehicle, comprising:
   a lower rail which includes a pair of side wall portions provided to extend in a front-rear direction of a vehicle and provided to line up in a width direction of the vehicle seat slide device, a connecting wall portion which connects bottom ends of the side wall portions to each other in the width direction, a pair of inward-extending wall portions which overhang from top ends of the side wall portions to inside in the width direction in which the inward-extending wall portions approach each other, and a pair of downward-extending wall portions which overhang downward from tips of the inward-extending wall portions;
   an upper rail which is joined to the lower rail that moves in the front-rear direction of the vehicle and includes a main body portion which is disposed between the downward-extending wall portions, and a pair of flanges which overhang from a tip of the main body portion to outside in the width direction in which the flanges separate from each other and are further folded to be surrounded by the side wall portions, the inward-extending wall portions, and the downward-extending wall portions;

a locking member that restricts movement of the upper rail in the front-rear direction of the vehicle relative to the lower rail; and a reinforcement member which is bonded to a rear end of the lower rail, and includes a side wall reinforcement portion covering the side wall portion and an inward-extending wall reinforcement portion which overhangs from a top end of the side wall reinforcement portion to an inside in the width direction to cover the inward-extending wall portion, and in which a cutout is formed in a rear end of the inward-extending wall reinforcement portion such that peripheral parts of a corner portion formed by a rear end of the inward-extending wall portion and the tip of the inward-extending wall portion are exposed, and the rear end of the inward-extending wall reinforcement portion has a shortest width of the inward-extending wall reinforcement portion.

2. The vehicle seat slide device according to claim 1, wherein the reinforcement member includes a pair of the side wall reinforcement portions and a pair of the inward-extending wall reinforcement portions, and where the cutout is formed in each of the inward-extending wall reinforcement portions.

3. The vehicle seat slide device according to claim 1, wherein the lower rail and the reinforcement member are bonded via a weld bonding portion, and wherein the weld bonding portion is set to not be disposed at the cutout.

4. The vehicle seat slide device according to claim 1, wherein the inward-extending wall reinforcement portion includes a removed portion by a removal of a portion of the inside in the width direction from a front-rear direction middle portion along a front end of the inward-extending wall reinforcement portion.

* * * * *